March 30, 1943.  R. P. GUTTERMAN  2,314,935

SERVING TRAY

Filed Aug. 6, 1940

Inventor:
Robert P. Gutterman,
by Thomson & Thomson
Attorneys

Patented Mar. 30, 1943

2,314,935

UNITED STATES PATENT OFFICE 2,314,935

SERVING TRAY

Robert P. Gutterman, Brookline, Mass.

Application August 6, 1940, Serial No. 351,574

1 Claim. (Cl. 65—53)

This invention relates to serving trays, and pertains more particularly to disposable trays or plates made of paperboard for serving ice cream cones, or sandwiches, or other foods at road-side stands.

The principal purpose of the invention is to provide a simple and inexpensive serving tray or plate provided with deformable areas normally capable of supporting articles of light weight, but readily yielding to pressure, thereby to receive and hold an ice cream cone or other conical object in upright position. Thus, the improved tray may be employed as a flat plate for holding sandwiches or the like; it may serve to carry a number of ice cream cones; or it may be used for both purposes; and the inexpensive tray may be discarded after it has served its purpose.

A recommended embodiment of the invention is illustrated in the accompanying drawing in which.

The tray or plate is preferably made of relatively stiff but inexpensive paperboard, pressed or molded to provide a bottom 11 and a marginal flange 12; and the tray may be circular as shown or of any other desired shape.

Figure 1:
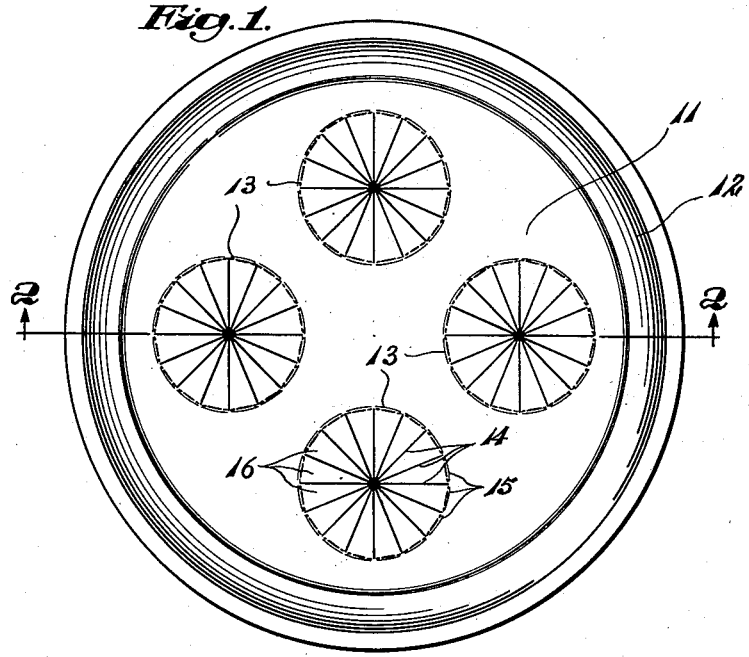
Fig. 1 is a plan view of the improved tray.

The flat bottom of the tray is provided with a plurality of deformable areas as indicated generally at 13 in Fig. 1, preferably formed by a cutting or stamping die at the time the plate is cut and molded from the paperboard material. Each of the areas 13 is circular in outline and comprises a series of radial cuts or slits 14 and partially cut or weakened chords 15 connecting the outer ends of adjacent slits at the circumference of the circular area, thereby providing a number of contiguous triangular tongues or fingers 16. These fingers bend downwardly on the hinges formed at the bases of the respective triangles by said scored or weakened chords 15, when the point of an ice cream cone 17 is forcibly inserted in the center of any one of the deformable areas 13.

The chords or hinges 15 are nevertheless sufficiently strong to resist bending stresses, so that the cut out fingers 16 are normally retained, undistorted, in the plane of the tray bottom, completely filling the circular area and supporting any articles which would normally be placed on the tray, as if the deformable area were not slit. For the same reason, when an ice cream cone is inserted as shown in Fig. 2, the hinges and downwardly bent fingers 16 closely hug the surface of the cone thereby holding it in upright position and preventing drops of melted ice cream from dripping through the bottom of the tray around the cone.

Figure 2:
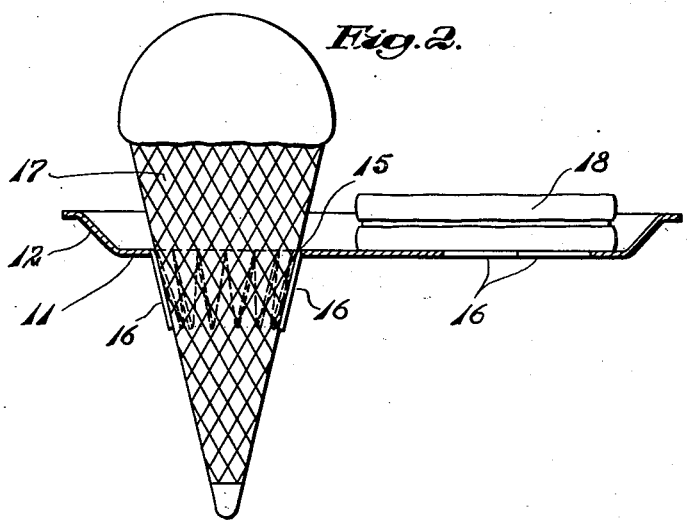
Fig. 2 is a sectional view taken on line 2—2 of Fig. 1 and showing an ice cream cone and a sandwich supported on the tray.

It will be evident that the improved serving tray herein illustrated may be used for carrying four ice cream cones inserted in each of the four distortable areas 13; it may be employed to serve sandwiches, beverage cups, or other foods placed on or across the closed, leak-proof areas 13; and it may be used for carrying both cones 17 and sandwiches 18 or the like, as shown in Fig. 2.

By providing the deformable areas 13, an ordinary paper plate is thus simply and inexpensively converted into a handy and efficient serving tray for carrying ice cream cones or other conical shaped articles, as well as other edibles which the plate was originally designed to hold; and it will be evident that a tray formed with the peripheral flange or rim 12 will hold any melted ice cream or liquids which may be spilled from the cones or containers supported by the tray, thereby protecting the hands and clothing of the user from soilage. The tray may, as aforesaid, be formed and slit by simple stamping operations from inexpensive paperboard; and it will be understood that the term "paperboard" is intended to cover any equivalent material which may be provided with the deformable areas 13 for the purposes described.

I claim:

A serving tray for ice cream cones and other foods or beverages, comprising a paperboard plate having an upstanding peripheral rim and a plurality of deformable, circular areas each including a plurality of radial slits extending from the center thereof and partially slit chords between the outer ends of said slits at the circumference of the circular area, said chords constituting resistant hinges and said slits and chords defining triangular fingers normally disposed in the plane of the plate bottom and completely filling the circular area to support articles placed thereon and prevent leakage therethrough, the fingers bending downwardly on said hinges when the tip of an ice cream cone is inserted at the center of said area, and the hinges and fingers closely hugging the exterior of the inserted cone, thereby holding it in upright position and preventing melted ice cream from dripping through the plate bottom at said area.

ROBERT P. GUTTERMAN.